(No Model.) 2 Sheets—Sheet 1.
H. BARRETT & J. J. VARLEY.
ELASTIC WHEEL TIRE AND DRIVING BAND.
No. 345,476. Patented July 13, 1886.
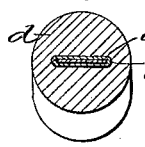
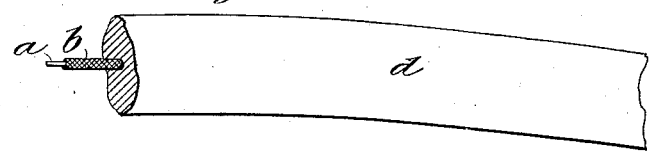
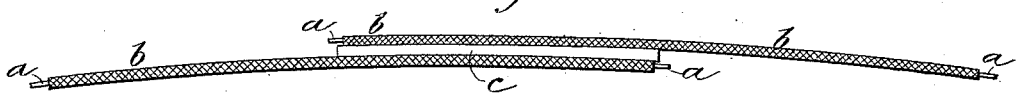
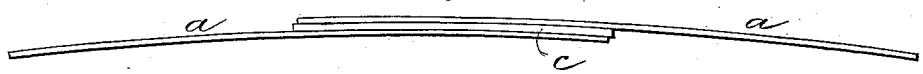
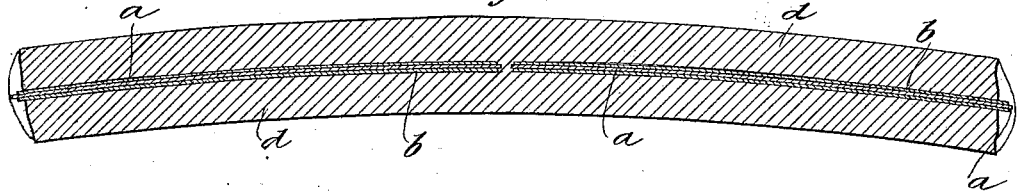
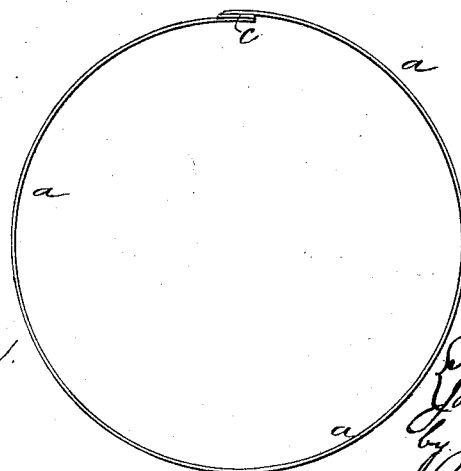
Witnesses.
Will T Norton
Wm R Davis
Inventors,
Henry Barrett
John James Varley
by John J. Halsted & Son
their Attys (No Model.) 2 Sheets—Sheet 2.
H. BARRETT & J. J. VARLEY.
ELASTIC WHEEL TIRE AND DRIVING BAND.
No. 345,476. Patented July 13, 1886.
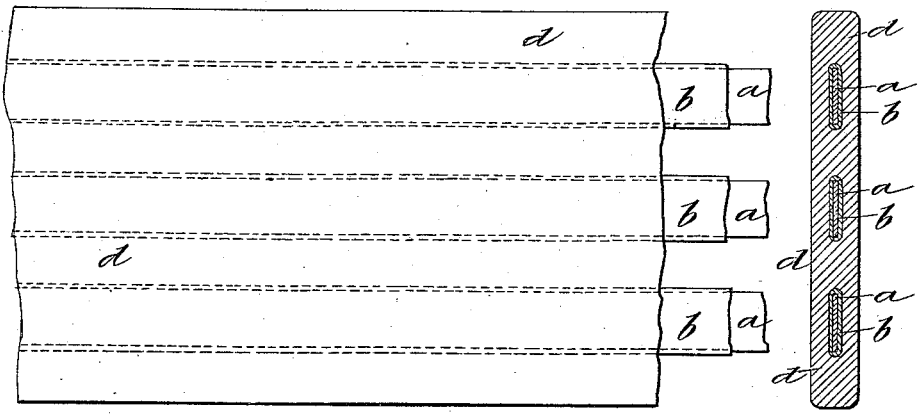
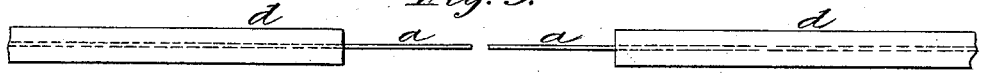
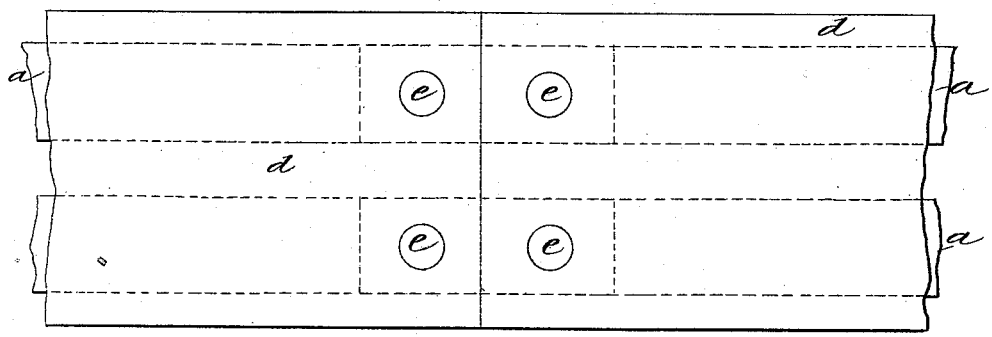

UNITED STATES PATENT OFFICE.

HENRY BARRETT AND JOHN JAMES VARLEY, OF LONDON, ENGLAND.

ELASTIC WHEEL-TIRE AND DRIVING-BAND.

SPECIFICATION forming part of Letters Patent No. 345,476, dated July 13, 1886.

Application filed December 16, 1885. Serial No. 185,786. (No model.)

*To all whom it may concern:*

Be it known that we, HENRY BARRETT and JOHN JAMES VARLEY, subjects of the Queen of Great Britain, both residing at London, England, have invented new and useful Improvements in Elastic Wheel-Tires and Driving-Bands, of which the following is a specification.

This invention relates to constructing elastic wheel-tires and driving-bands of vulcanized india-rubber over a flat core, consisting of a strip or length (or strips or lengths) of suitable metal, such as flat spring-steel, or of other suitable material, such as ebonite.

In order to enable our invention to be fully understood, we will describe the same by reference to the accompanying drawings, in which—

Figure 1 is an elevation of a portion of an elastic wheel-tire provided with a flat core, according to our invention, the core being covered with a suitable material, such as hemp. Fig. 2 is a cross-section of the same. Fig. 3 is a side elevation of a portion of the core, showing the ends thereof lapped over each other and connected by a strip of rubber forming a spring. Fig. 4 is a similar view to Fig. 3, but showing the core without the covering. Fig. 5 is a longitudinal section of a portion of a tire having a core similar to that shown in Figs. 1 and 2, the ends of the core not being lapped over each other. Fig. 6 is a view, on a reduced scale, of the complete core. Figs. 7 and 8 are a plan and cross-section, respectively, showing our improvements applied to the construction of elastic driving-bands, the core being provided with a covering similar to that shown in Figs. 1, 2, 3, and 5. Fig. 9 is an elevation of the two ends of a driving-band provided with a flat core without a covering, and showing the said ends before they are joined together. Fig. 10 is a plan, and Fig. 11 a longitudinal section showing improved means for joining the said ends together.

Similar letters in all the figures represent similar or corresponding parts.

Referring to Figs. 1, 2, 3, and 6, *a* represents the flat core, consisting of a strip or length of suitable flexible metal, such as flat spring-steel, which is shown covered with a suitable material, *b*, such as hemp. The said core is formed into a circle or ring of the required size, as shown in Fig. 6, and the ends of the core are lapped over each other, as clearly shown in Fig. 3. A strip or layer of vulcanized india-rubber, *c*, is then inserted between and attached to the said ends by means of solution or otherwise, so as to form a spring, which will allow of the tire being stretched when placing the same over the felly of the wheel; or, the ends of the core can be merely overlapped without being connected by the said spring *c*, and the ends of the core in this case would merely slide over each other when the tire is stretched, one or both ends of the core being provided with a clip or guide, so as to prevent the ends of the core separating.

*d*, Figs. 1 and 2, is the tire, which is formed by covering the core, made as described, and shown in Fig. 6, with rubber dough, or the compound used to produce vulcanized india-rubber, which is then cured or treated in the manner usual to produce vulcanized india-rubber. By these means we thus obtain an endless elastic wheel-tire provided with a flat core, which tire can be spring into the groove in the rim of a wheel and cannot then be easily displaced or removed, as the tire, being placed with the core flatwise in the rim or felly of a wheel, will be prevented from rolling out of its place and coming off the wheel, which has hitherto been the source of frequent annoyance and loss of time. The tire can also be fixed in the rim without the use of cement. Further, when the surface of the tire has become worn, the tire can be removed and replaced in the rim or felly of the wheel in the reverse position—that is to say, with the worn surface within the rim or felly, thereby allowing of the whole of the tire being used.

Instead of the flat core being covered with fabric, as hereinbefore described, and shown in Figs. 1, 2, and 3, the core can be used without the fabric, as shown in Fig. 4.

The core of the tire illustrated in Fig. 5 is the same as that hereinbefore described when referring to Figs. 1, 2, 3, and 6, with the exception that the ends are not overlapped, but are brought to within a short distance of each other, the elastic material *d* of the tire intervening between the said ends, in order to give the required elasticity to allow the tire to be sprung over the felly of the wheel; or, as will be well understood, the ends of the core can be connected by means of a suitable spring, which will give the required elasticity.

Instead of covering the core when of metal with material such as hemp, as hereinbefore described, and shown in Figs. 1, 2, 3, and 5, it may be covered with hard rubber or other suitable material. Further, the core itself may be formed of ebonite, in which case no covering would be required.

It will be obvious that instead of forming the core for each tire in a single length, as hereinbefore described, and shown in Fig. 6, it may be formed in sections.

The application of our invention to the manufacture of driving-bands for machinery will be readily understood by reference to Figs. 7 and 8, in which $a\ b$ represent the flat cores made as hereinbefore described, a number of which are employed according to the width of the band. In the drawings the band is shown with three strips or cores. Otherwise the band is made in a similar manner to that described for the wheel-tires. If the driving-band be formed in one continuous piece, the ends of the flat core would be joined, by preference, in the manner shown in Fig. 3. If otherwise, however, the ends of the driving-band can be joined in the manner illustrated in Figs. 9, 10, and 11. For this purpose we cut away the elastic covering $d$ of the core $a$ for a certain distance at each end of the band, as shown in Fig. 9, so as to leave the cores projecting therefrom. The projecting ends of the cores $a$ are then passed one over the other, the ends passing into the band between the cores $a$ and the elastic covering $d$ until the cut-away ends of the elastic covering meet. Rivets $e$ (or screws, staples, or the like) are then passed through the band at either side of the joint, as shown in Figs. 10 and 11, so as to connect the parts firmly together. By this method we obtain a joint which is flush and smooth; or the ends of the driving-band can be laced in the usual manner.

Having now particularly described and ascertained the nature of our said invention, and in what manner the same is to be performed, we declare that what we claim is—

1. An elastic tire-wheel or driving-band having a flat core, the ends of which are joined by the insertion of a flat strip or layer of india-rubber or like material between and attaching it to said ends, substantially as described.

2. An elastic vulcanized rubber tire adapted to be sprung into a groove in the rim of a wheel, and having integral with and inclosed within it a flat internal metal core covered with a suitable material, such as hemp.

3. An endless rubber band or belt having a core or cores of metal or its described equivalent, the ends of such cores being overlapped and united together within the rubber.

4. An endless rubber band or belt having cores of metal or its described equivalent, the ends of which cores overlap within the rubber, and with a piece of rubber interposed between these ends, as and for the purpose described.

H. BARRETT.
J. J. VARLEY.

Witnesses:
G. T. REDFERN,
J. W. PRICE.